(12) United States Patent
Eguchi et al.

(10) Patent No.: US 11,384,220 B2
(45) Date of Patent: Jul. 12, 2022

(54) WHITE RESIN COMPOSITION

(71) Applicant: SHIRAISHI KOGYO KAISHA, LTD., Osaka (JP)

(72) Inventors: Kenichiro Eguchi, Amagasaki (JP); Yutaka Minamino, Amagasaki (JP); Masahiro Matsui, Amagasaki (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 83 days.

(21) Appl. No.: 16/339,467

(22) PCT Filed: Oct. 17, 2016

(86) PCT No.: PCT/JP2016/080648
§ 371 (c)(1),
(2) Date: Apr. 4, 2019

(87) PCT Pub. No.: WO2018/073854
PCT Pub. Date: Apr. 26, 2018

(65) Prior Publication Data
US 2020/0040158 A1 Feb. 6, 2020

(51) Int. Cl.
| | | |
|---|---|---|
| *C08K 3/22* | (2006.01) |
| *C08K 9/02* | (2006.01) |
| *C08K 9/06* | (2006.01) |
| *C08K 3/014* | (2018.01) |
| *C08L 77/00* | (2006.01) |
| *C08K 3/013* | (2018.01) |
| *B29C 45/00* | (2006.01) |
| *C08K 3/26* | (2006.01) |

(52) U.S. Cl.
CPC ............... *C08K 3/22* (2013.01); *C08K 3/013* (2018.01); *C08K 3/014* (2018.01); *C08K 9/02* (2013.01); *C08K 9/06* (2013.01); *C08L 77/00* (2013.01); *B29C 45/00* (2013.01); *C08K 2003/2237* (2013.01); *C08K 2003/265* (2013.01); *C08K 2201/003* (2013.01); *C08L 2310/00* (2013.01)

(58) Field of Classification Search
CPC ... C08K 3/22; C08K 9/02; C08K 9/06; C08K 3/013; C08K 3/014; C08L 77/00
USPC ......................................................... 524/430
See application file for complete search history.

(56) References Cited

U.S. PATENT DOCUMENTS

| | | |
|---|---|---|
| 2007/0213458 A1 | 9/2007 | Topoulos |
| 2011/0310622 A1 | 12/2011 | Topoulos |
| 2013/0158184 A1 | 6/2013 | Topoulos |
| 2015/0152241 A1 | 6/2015 | Hong et al. |
| 2016/0090470 A1 | 3/2016 | Park et al. |
| 2017/0084801 A1 | 3/2017 | Topoulos |

FOREIGN PATENT DOCUMENTS

| | | |
|---|---|---|
| JP | 54-35897 A | 3/1979 |
| JP | 54-37099 A | 3/1979 |
| JP | H07-331038 A | 12/1995 |
| JP | H08-244188 A | 9/1996 |
| JP | 2002-309112 A | 10/2002 |
| JP | 2009-507990 A | 2/2009 |
| JP | 2009-249492 A | 10/2009 |
| JP | 2013-57034 A | 3/2013 |
| JP | 2013-203851 A | 10/2013 |
| JP | 2014-58427 A * | 4/2014 |
| JP | 2014-58427 A | 4/2014 |
| JP | 5902017 B2 * | 4/2016 |

OTHER PUBLICATIONS

Extended (Supplementary) European Search Report dated Apr. 29, 2020, issued in counterpart EP application No. 16919055.0. (7 pages).
Notification of Transmittal of Translation of the International Preliminary Report on Patentability (Form PCT/IB/338) issued in counterpart International Application No. PCT/JP2016/080648 dated May 2, 2019, with Forms PCT/IB/373 and PCT/ISA/237. (7 pages).
International Search Report dated Jan. 10, 2017, issued in counterpart International Application No. PCT/JP2016/080648 (2 pages).

* cited by examiner

*Primary Examiner* — Deve V Hall
(74) *Attorney, Agent, or Firm* — WHDA, LLP

(57) ABSTRACT

Provided is a white resin composition that can maintain a high degree of whiteness even after undergoing a thermal resistance test. A white resin composition contains: a white pigment; a surface-treated calcium carbonate in which particle surfaces of a synthetic calcium carbonate with an average particle diameter of 0.05 to 1 μm are subjected to surface treatment with a condensed phosphoric acid and an organic modified silicone oil; and a resin, wherein a content ratio between the white pigment and the surface-treated calcium carbonate is, in mass ratio (white pigment to surface-treated calcium carbonate), within a range of 90:10 to 60:40, and a total content of the white pigment and the surface-treated calcium carbonate in the resin composition is within a range of 5 to 70% mass.

7 Claims, No Drawings

WHITE RESIN COMPOSITION

TECHNICAL FIELD

The present invention relates to white resin compositions containing a white pigment and a surface-treated calcium carbonate.

BACKGROUND ART

Patent Literature 1 discloses, as a white resin composition containing a white pigment and a surface-treated calcium carbonate, a white resin composition in which a white pigment and silica-treated calcium carbonate are used in combination.

CITATION LIST

Patent Literature

Patent Literature 1: JP-A-2014-58427

SUMMARY OF INVENTION

Technical Problem

As disclosed in Patent Literature 1, the combined use of a white pigment and silica-treated calcium carbonate can give the resin a high degree of whiteness. In recent years, there has been a need for a white resin composition that can maintain a high degree of whiteness even after undergoing a thermal resistance test.

An object of the present invention is to provide a white resin composition that can maintain a high degree of whiteness even after undergoing a thermal resistance test.

Solution to Problem

A white resin composition according to the present invention is a white resin composition containing: a white pigment; a surface-treated calcium carbonate in which particle surfaces of a synthetic calcium carbonate with an average particle diameter of 0.05 to 1 μm are subjected to surface treatment with a condensed phosphoric acid and an organic modified silicone oil; and a resin, wherein a content ratio between the white pigment and the surface-treated calcium carbonate is, in mass ratio (white pigment to surface-treated calcium carbonate), within a range of 50:10 to 60:40, and a total content of the white pigment and the surface-treated calcium carbonate in the resin composition is within a range of 5 to 70% by mass.

The calcium carbonate is preferably subjected to surface treatment with the condensed phosphoric acid so that a content of phosphorus in the surface-treated calcium carbonate falls within a range of 0.2 to 2% by mass.

An amount of the organic modified silicone oil for the treatment in the surface-treated calcium carbonate is preferably within a range of 0.1 to 10 parts by mass relative to 100 parts by mass of calcium carbonate.

An example of the organic modified silicone oil is epoxy-modified silicone oil.

Titanium oxide is preferably used as the white pigment.

Advantageous Effects of Invention

The present invention enables provision of a white resin composition that can maintain a high degree of whiteness even after undergoing a thermal resistance test.

DESCRIPTION OF EMBODIMENTS

Hereinafter, a description will be given in more detail of the present invention.

<Surface-Treated Calcium Carbonate>

A surface-treated calcium carbonate for use in the present invention is a surface-treated calcium carbonate in which the particle surfaces of a synthetic calcium carbonate with an average particle diameter of 0.05 to 1 μm are subjected to surface treatment with a condensed phosphoric acid and an organic modified silicone oil. The average particle diameter of calcium carbonate based on the treatment is within a range of 0.05 to 1 μm, more preferably within a range of 0.08 to 0.5 μm, and still more preferably within a range of 0.1 to 0.3 μm. If the average particle diameter falls out of these ranges, a high degree of whiteness due to the combined use with the white pigment may not be able to be maintained. The average particle diameter of the surface-treated calcium carbonate is preferably within the same ranges as the above ranges of average particle diameters of calcium carbonate based on the treatment.

The average particle diameter can be measured, in the present invention, by image analysis of an electron photomicrograph.

The synthetic calcium carbonate can be produced, for example, by reacting calcium hydroxide with carbon dioxide. Calcium hydroxide can be produced, for example, by reacting calcium oxide with water. Calcium oxide can be produced, for example, by mixing raw limestone with coke or the like and firing the mixture. In this case, because carbon dioxide generates during the firing, calcium carbonate can be produced by injecting the carbon dioxide into a water suspension liquid of calcium hydroxide to react carbon dioxide with calcium hydroxide.

The synthetic calcium carbonate preferably includes calcite crystals. Furthermore, the synthetic calcium carbonate preferably has an approximately cubic shape.

(Surface Treatment with Condensed Phosphoric Acid)

Examples of the condensed phosphoric acid that can be used include pyrophosphoric acid and metaphosphoric acid.

Examples of the method for subjecting calcium carbonate to surface treatment with a condensed phosphoric acid include a wet treatment and a dry treatment.

The wet treatment is the method of adding a condensed phosphoric acid into a water suspension liquid of calcium carbonate, mixing them, then filtering out calcium carbonate from the mixture, and drying calcium carbonate. In this method, an alkali metal salt, such as a sodium salt or a potassium salt, of the condensed phosphoric acid may be used. However, from the viewpoint of reducing the content of alkali metal, such as sodium or potassium, in the surface-treated calcium carbonate, the condensed phosphoric acid is preferably used, not in the form of a salt, but in the form of an acid.

The dry treatment is the method of adding a condensed phosphoric acid to calcium carbonate powder, mixing them, and then drying the mixture. The condensed phosphoric acid can be added in the form of a solution.

The amount of condensed phosphoric acid for the treatment is preferably such an amount for the treatment that the content of phosphorus in the surface-treated calcium carbonate falls within a range of 0.2 to 2% by mass. The content of phosphorus in the surface-treated calcium carbonate is more preferably within a range of 0.4 to 1.8% by mass and particularly preferably within a range of 0.6 to 1.6% by mass. If the amount of condensed phosphoric acid for the treatment is too small, particle surfaces of calcium carbonate having not been surface-treated are found and the resin is deteriorated and colored beginning at the surfaces. Therefore, a high degree of whiteness of the resin may not be able to be maintained. On the other hand, if the amount of condensed phosphoric acid for the treatment is too large, free condensed phosphoric acid having not reacted with particle surfaces of calcium carbonate reacts with the resin, so that the resin is colored. Therefore, a high degree of whiteness of the resin may not be able to be maintained.

The content of phosphorus in the surface-treated calcium carbonate can be measured, for example, by the ICP emission spectrometric analysis method.

(Surface Treatment with Organic Modified Silicone Oil)

Examples of the organic modified silicone oil include epoxy-modified silicone oil, amino-modified silicone oil, amine-modified silicone oil, mercapto-modified silicone oil, carboxyl-modified silicone oil, polyether-modified silicone oil, fluoroalkyl-modified silicone oil, long-chain alkyl-modified silicone oil, phenyl-modified silicone oil, higher fatty acid ester-modified silicone oil, higher fatty acid amide-modified silicone oil, acrylic modified silicone oil, methacrylic modified silicone oil, carboxylic acid anhydride-modified silicone oil, carbinol-modified silicone oil, and diol-modified silicone oil. Among these organic modified silicone oils, epoxy-modified silicone oil is particularly preferably used. Examples of the epoxy-modified silicone oil include dual-end epoxy-modified silicone oil, single-end epoxy-modified silicone oil, side-chain epoxy-modified silicone oil, and side-chain dual-end epoxy-modified silicone oil.

As a surface treatment method of the organic modified silicone oil, a dry treatment method is preferably used of adding the organic modified silicone oil to calcium carbonate powder, mixing them, and drying the mixture by the application of heat. The organic modified silicone oil is preferably added, if necessary, in the form of a solution in which the silicone oil is dissolved in a solvent.

In the case where calcium carbonate is treated with the organic modified silicone oil after being treated with the condensed phosphoric acid, the treatment is made by adding the organic modified silicone oil to surface-treated calcium carbonate powder after being treated with the condensed phosphoric acid.

The amount of organic modified silicone oil for the treatment is preferably 0.1 to 10 parts by mass, more preferably 0.2 to 5 parts by mass, and still more preferably 0.5 to 3 parts by mass relative to 100 parts by mass of calcium carbonate. If the amount of organic modified silicone oil for the treatment is too small, a high degree of whiteness of the resin may not be able to be maintained. On the other hand, if the amount of organic modified silicone oil for the treatment is too large, the organic modified silicone oil may bleed out on the surface of the resin to contaminate the surface of the resin.

The order of surface treatments with the condensed phosphoric acid and the organic modified silicone oil is preferably the order in which calcium carbonate is subjected to a surface treatment with the condensed phosphoric acid and then a surface treatment with the organic modified silicone oil. However, calcium carbonate may be concurrently subjected to a surface treatment with the condensed phosphoric acid and the organic modified silicone oil or may be subjected to a surface treatment with the organic modified silicone oil and then a surface treatment with the condensed phosphoric acid.

<White Pigment>

Examples of the white pigment include titanium oxide, zinc oxide, and zinc sulfide. Of these white pigments, titanium oxide is particularly preferably used.

<Resin>

The resin for use in the present invention may be either a thermoplastic resin or a thermosetting resin.

Examples of the thermoplastic resin include polyamide, polyacetal, polyphenylene sulfide, polycarbonate, polybutylene terephthalate, polyethylene terephthalate, modified polyphenylene ether, polycyclohexane dimethylene terephthalate, crystalline polyester, and polyether imide. Alternatively, the thermoplastic resin may be a polymer alloy in which a plurality of polymers are mixed. Examples of the thermosetting resin include epoxy resin, phenolic resin, unsaturated polyester resin, amino resin, urea resin, and silicone resin.

(Mixing Ratio)

The content ratio between the white pigment and the surface-treated calcium carbonate is, in mass ratio (white pigment to surface-treated calcium carbonate), within a range, of 90:10 to 60:40 and preferably within a range of 80:20 to 70:30. If the content ratio of the surface-treated calcium carbonate is too small, a white resin composition may not sufficiently show the effect of being able to maintain a high degree of whiteness even after undergoing a thermal resistance test. Also if the content ratio of the surface-treated calcium carbonate is too large, a white resin composition may not sufficiently show the effect of being able to maintain a high degree of whiteness even after undergoing a thermal resistance test.

The total content of the white pigment and the surface-treated calcium carbonate in the resin composition is within a range of 5 to 70% by mass, preferably within a range of 10 to 70% by mass, and more preferably within a range of 20 to 70% by mass. If the total content of the white pigment and the surface-treated calcium carbonate is too small, the resin may not be able to be given a sufficiently high degree of whiteness. On the other hand, if the total content of the white pigment and the surface-treated calcium carbonate is too large, the mechanical strength of the resin composition may decrease or it may become difficult to mix the white pigment and the surface-treated calcium carbonate into the resin, thus degrading the moldability of the resin composition.

(Production of White Resin Composition)

A white resin composition according to the present invention can be produced by mixing the white pigment and the surface-treated calcium carbonate into the resin to disperse the white pigment and the surface-treated calcium carbonate into the resin. The production of the white resin composition can be appropriately made by a known method according to the resin for use.

In using a thermoplastic resin as the resin, it is possible to add the white pigment and the surface-treated calcium carbonate into the thermoplastic resin being melted by the application of heat and incorporate the white pigment and the surface-treated calcium carbonate into the resin, for example, with a twin-screw extruder-kneader or a kneader.

Alternatively, the white resin composition may be produced by preparing a master batch in which the white pigment and the surface-treated calcium carbonate are incorporated at high concentrations into a resin, and adding a resin to the master batch. Furthermore, a molded article in which the white resin composition according to the present invention is used can be appropriately produced by a known method according to the resin for use. For example, injection molding, extrusion molding, inflation molding, hollow molding, compression molding or transfer molding can be used.

EXAMPLES

Hereinafter, a description will be given of specific examples according to the present invention, but the present invention is not limited to the following examples.

[Preparation of Surface-Treated Calcium Carbonate]

Preparation Example 1

Synthetic calcium carbonate with an average particle diameter of 0.15 μm (measured by image analysis of an electron photomicrograph) was used as calcium carbonate based on the treatment. Note that the shape of the synthetic calcium carbonate is approximately cubic and its crystalline form is a calcite crystal.

A 10% by mass water suspension liquid (slurry) of the synthetic calcium carbonate was prepared and a 10% by mass dilute aqueous solution of pyrophosphoric acid was added to the water suspension liquid of synthetic calcium carbonate so that the amount of pyrophosphoric acid reached 5 parts by mass, followed by mixing with stirring for 10 minutes. Thereafter, the mixture was subjected to dehydration, drying, and grinding, thus obtaining condensed phosphoric acid-treated calcium carbonate in which calcium carbonate was treated with pyrophosphoric acid.

The obtained condensed phosphoric acid-treated calcium carbonate was put into a stirring mixer, dual-end epoxy-modified silicone oil was added into the mixer to reach 2 parts by mass relative to 100 parts by mass of calcium carbonate in the condensed phosphoric acid-treated calcium carbonate, followed by mixing with stirring at 80° C. for 10 minutes, thus obtaining surface-treated calcium carbonate in which calcium carbonate was subjected to surface treatment with condensed phosphoric acid and organic modified silicone oil.

The content of phosphorus in the obtained surface-treated calcium carbonate was, when measured by the ICP emission spectrometric analysis method, 0.9% by mass.

Preparation Example 2

Surface-treated calcium carbonate was obtained in the same manner as in Preparation Example 1 except that synthetic calcium carbonate with an average particle diameter of 0.05 μm was used as calcium carbonate based on the treatment. The content of phosphorus in the obtained surface-treated calcium carbonate was, when measured by the ICP emission spectrometric analysis method, 0.9% by mass.

Preparation Example 3

Surface-treated calcium carbonate was obtained in the same manner as in Preparation Example 1 except that synthetic calcium carbonate with an average particle diameter of 0.1 μm was used as calcium carbonate based on the treatment. The content of phosphorus in the obtained surface-treated calcium carbonate was, when measured by the ICP emission spectrometric analysis method, 0.9% by mass.

Preparation Example 4

Surface-treated calcium carbonate was obtained in the same manner as in Preparation Example 1 except that synthetic calcium carbonate with an average particle diameter of 0.3 μm was used as calcium carbonate based on the treatment. The content of phosphorus in the obtained surface-treated calcium carbonate was, when measured by the ICP emission spectrometric analysis method, 0.9% by mass.

Preparation Example 5

Surface-treated calcium carbonate was obtained in the same manner as in Preparation Example 1 except that synthetic calcium carbonate with an average particle diameter of 0.5 μm was used as calcium carbonate based on the treatment. The content of phosphorus in the obtained surface-treated calcium carbonate was, when measured by the ICP emission spectrometric analysis method, 0.9% by mass.

Preparation Example 6

Surface-treated calcium carbonate was obtained in the same manner as in Preparation Example 1 except that synthetic calcium carbonate with an average particle diameter of 1 μm was used as calcium carbonate based on the treatment. The content of phosphorus in the obtained surface-treated calcium carbonate was, when measured by the ICP emission spectrometric analysis method, 0.9% by mass.

Preparation Example 7

Surface-treated calcium carbonate was obtained in the same manner as in Preparation Example 1 except that the amount of organic modified silicone oil for the treatment was 0.5 parts by mass.

Preparation Example 8

Surface-treated calcium carbonate was obtained in the same manner as in Preparation Example 1 except that the amount of organic modified silicone oil for the treatment was 5 parts by mass.

Preparation Example 9

Surface-treated calcium carbonate was obtained in the same manner as in Preparation Example 1 except that the amount of pyrophosphoric acid added was 1.5 parts by mass. The content of phosphorus in the obtained surface-treated calcium carbonate was, when measured by the ICP emission spectrometric analysis method, 0.3% by mass.

Preparation Example 10

Surface-treated calcium carbonate was obtained in the same manner as in Preparation Example 1 except that the amount of pyrophosphoric acid added was 10 parts by mass. The content of phosphorus in the obtained surface-treated calcium carbonate was, when measured by the ICP emission spectrometric analysis method, 1.9% by mass.

Preparation Example 11

Surface-treated calcium carbonate was obtained in the same manner as in Preparation Example 1 except that metaphosphoric acid was used as the condensed phosphoric acid instead of pyrophosphoric acid.

Preparation Example 12

Surface-treated calcium carbonate was obtained in the same manner as in Preparation Example 1 except that single-end epoxy-modified silicone oil was used instead of dual-end epoxy-modified silicone oil.

Comparative Preparation Example 1

Surface-treated calcium carbonate was obtained in the same manner as in Preparation Example 1 except that synthetic calcium carbonate with an average particle diameter of 0.03 μm was used as calcium carbonate based on the treatment. The content of phosphorus in the obtained surface-treated calcium carbonate was, when measured by the ICP emission spectrometric analysis method, 0.9% by mass.

Comparative Preparation Example 2

Surface-treated calcium carbonate was obtained in the same manner as in Preparation Example 1 except that synthetic calcium carbonate with an average particle diameter of 2 μm was used as calcium carbonate based on the treatment. The content of phosphorus in the obtained surface treated calcium carbonate was, when measured by the ICP emission spectrometric analysis method, 0.9% by mass.

Comparative Preparation Example 3

Surface-treated calcium carbonate was obtained u the same manner as in Preparation Example 1 except that heavy calcium carbonate with an average particle diameter of 2 μm was used as calcium carbonate based on the treatment. The content of phosphorus in the obtained surface-treated calcium carbonate was, when measured by the ICP emission spectrometric analysis method, 0.9% by mass.

Note that the shape of the heavy calcium carbonate is amorphous and its crystalline form is a calcite crystal.

Comparative Preparation Example 4

No. 3 liquid glass was added into the water suspension liquid of calcium carbonate in Preparation Example 1 so that its amount for the treatment as $SiO_2$ reached 2 parts by mass relative to 100 parts by mass of synthetic calcium carbonate. The mixture liquid after the addition was stirred for 10 minutes and carbon dioxide was then introduced into the mixture liquid to precipitate silica on the particle surfaces of calcium carbonate. Thereafter, the mixture was subjected to dehydration, drying, and grinding, thus obtaining silica-treated calcium carbonate.

The obtained silica-treated calcium carbonate was put into a stirring mixer, dual-end epoxy-modified silicone oil was added into the mixer to reach 2 parts by mass relative to 100 parts by mass of calcium carbonate in the silica-treated calcium carbonate, followed by mixing with stirring at 80° C. for 10 minutes. thus obtaining surface-treated calcium carbonate in which calcium carbonate was subjected to surface treatment with silica and organic modified silicone oil.

Comparative Preparation Example 5

The condensed phosphoric acid-treated calcium carbonate in Preparation Example 1 was used as it was, without being treated with an organic modified silicone oil.

Comparative Preparation Example 6

Synthetic calcium carbonate with an average particle diameter of 0.15 was put into a stirring mixer, dual-end epoxy-modified silicone oil was added into the mixer to reach 2 parts by mass relative to 100 parts by mass of calcium carbonate, followed by mixing with stirring at 80° C. for 10 minutes, thus obtaining surface-treated calcium carbonate in which calcium carbonate was subjected to surface treatment with organic modified silicone oil only.

<Experiment 1>
[Preparation of White Resin Composition]

Examples 1 to 4 and Comparative Examples 1 to 4

Polyamide resin (Zytel 101L manufactured by DuPont) was used as resin. Titanium oxide (CR-60-2 manufactured by Ishihara Sangyo Kaisha, Ltd.) was used as a white pigment.

The surface-treated calcium carbonate obtained in Preparation Example 1 and the white pigment were mixed with 60 parts by mass of the resin to have their respective mixed amounts shown in Table 1 and the mixture was granulated with a twin-screw extruder. Pellets obtained by the granulation were produced into a molded body of a platy specimen with an injection molder.

Note that, in Comparative Example 4, untreated calcium carbonate with an average particle diameter of 0.15 μm was used instead of surface-treated calcium carbonate.

[Measurement, of Degree of Whiteness Before and After Thermal Resistance Test]

Each of the obtained molded bodies of white resin compositions was measured in terms of degrees of whiteness before and after a thermal resistance test in the following manner.

The measurement of the degree of whiteness was made by measuring each of the lightness (L value), redness (a value), and yellowness (b value) based on the Hunter's color difference equation defined in JIS Z 8730 three times with a spectrophotometric whiteness meter (ERP-80WX manufactured by Tokyo Denshoku Co., Ltd.) and averaging up the three measured values. The degree of whiteness W (Hunter's equation) was calculated from the following equation.

$$W=100-[(100-L)2+a2+b2]1/2$$

where a represents redness (a value), b represents yellowness (b value), and L represents lightness (L value).

The thermal resistance test was made by exposing the molded body to an atmosphere at 160° C. for two hours. The molded body before and after undergoing the thermal resistance test was measured in terms of degree of whiteness in the above manner.

The degree of whiteness of each molded body before the thermal resistance test and the degree of whiteness thereof after the thermal resistance test are shown in Table 1.

TABLE 1

| | | Mixed Amount [parts by mass](values in parenthesis represent content ratios between white pigment and surface-treated calcium carbonate) | | | Whiteness | |
|---|---|---|---|---|---|---|
| | Resin | White Pigment | Surface-Treated Calcium Carbonate | Untreated Calcium Carbonate | Before Thermal Resistance Test | After Thermal Resistance Test |
| Comparative Example 1 | 60 | 20(50) | 20(50) | — | 95.2 | 91.2 |
| Example 1 | 60 | 25(60) | 15(40) | — | 95.7 | 92.0 |
| Example 2 | 60 | 28(70) | 12(30) | — | 96.0 | 92.3 |
| Example 3 | 60 | 30(75) | 10(25) | — | 96.4 | 92.9 |
| Example 4 | 60 | 34(85) | 6(15) | — | 96.3 | 92.4 |
| Comparative Example 2 | 60 | 38(95) | 2(5) | — | 95.5 | 91.4 |
| Comparative Example 3 | 60 | 40 | — | — | 95.5 | 91.2 |
| Comparative Example 4 | 60 | 30(75) | — | 10(25) | 95.3 | 90.2 |

As seen from Table 1, Examples 1 to 4, the content ratio between white pigment and surface-treated calcium carbonate was, in mass ratio (white pigment to surface-treated calcium carbonate), within a range of 90:10 to 60:40 according to the present invention showed to have high degrees of whiteness before and after the thermal resistance test as compared to Comparative Example 1 in which the content ratio of white pigment to surface-treated calcium carbonate was 50:50 and Comparative Example 2 in which the content ratio of white pigment to surface-treated calcium carbonate was 95:5. In addition, Examples 1 to 4 showed to have high degrees of whiteness before and after the thermal resistance test as compared to Comparative Example 3 in which the resin contained 40% by mass white pigment only. Furthermore, Examples 1 to 4 showed to have high degrees of whiteness before and after the thermal resistance test as compared to Comparative Example 4 in which untreated calcium carbonate was used instead of surface-treated calcium carbonate Therefore, it can be seen that the effect of the present invention enabling the resin composition to have high degrees of whiteness before and after the thermal resistance test is obtained by using surface-treated calcium carbonate.

<Experiment 2>

Example 5

A white resin composition was obtained in the same manner as in Example 3 except that, as shown in Table 2, mixing was made so that the amounts of white pigment and surface-treated calcium carbonate were 3.75 parts by mass and 1.25 parts by mass, respectively, relative to 95 parts by mass of resin.

Example 6

A white resin composition was obtained in the same manner as in Example 3 except that, as shown in Table 2, mixing was made so that the amounts of white pigment and surface-treated calcium carbonate were 15 parts by mass and 5 parts by mass, respectively, relative to 80 parts by mass of resin.

Example 7

A white resin composition was obtained in the same manner as in Example 3 except that, as shown in Table 2, mixing was made so that the amounts of white pigment and surface-treated calcium carbonate were 45 parts by mass and 15 parts by mass, respectively, relative to 40 parts by mass of resin.

Example 8

A white resin composition was obtained in the same manner as in Example 3 except that, as shown in Table 2, mixing was made so that the amounts of white pigment and surface-treated calcium carbonate were 52.5 parts by mass and 17.5 parts by mass, respectively, relative to 30 parts by mass of resin.

Comparative Example 5

A white resin composition was obtained in the same manner as in Example 3 except that, as shown in Table 2, mixing was made so that the amounts of white pigment and surface-treated calcium carbonate were 2.25 parts by mass and 0.75 parts by mass, respectively, relative to 97 parts by mass of resin.

Note that when the total content of white pigment and surface-treated calcium carbonate was more than 70% by mass, the viscosity increased, which made it difficult to prepare a white resin composition.

[Measurement of Degree of Whiteness Before and After Thermal Resistance Test]

Each of the molded bodies of white resin compositions obtained in the above Examples and Comparative Examples was measured in terms of degrees of whiteness before and after the thermal resistance test in the same manner as in Experiment 1. The measurement results are shown in Table 2. Table 2 also shows the results of Example 3.

TABLE 2

| | Mixed Amount [parts by mass](values in parenthesis represent content ratios between white pigment and surface-treated calcium carbonate) | | | Whiteness | |
|---|---|---|---|---|---|
| | Resin | White Pigment | Surface Treated Calcium Carbonate | Untreated Calcium Carbonate | Before Thermal Resistance Test | After Thermal Resistance Test |
| Comparative Example 5 | 97 | 2.25(75) | 0.75(25) | — | 84.0 | 75.0 |
| Example 5 | 95 | 3.75(75) | 1.25(25) | — | 90.0 | 84.0 |
| Example 6 | 80 | 15(75) | 5(25) | — | 94.5 | 91.0 |
| Example 3 | 60 | 30(75) | 10(25) | — | 96.4 | 92.9 |
| Example 7 | 40 | 45(75) | 15(25) | — | 97.2 | 93.4 |
| Example 8 | 30 | 52.5(75) | 17.5(25) | — | 97.5 | 93.9 |

As seen from Table 2, Example 3 and Examples 5 to 8, in which the total content of white pigment and surface-treated calcium carbonate in the resin composition was within a range of 5 to 70% by mass according to the present invention, showed to have high degrees of whiteness before and after the thermal resistance test. On the other hand, Comparative Example 5, in which the total content of white pigment and surface-treated calcium carbonate in the resin composition was 3% by mass, did not have high degrees of whiteness before and after the thermal resistance test.

<Experiment 3>

Example 9

A white resin composition was obtained in the same manner as in Example 3 except that the surface-treated calcium carbonate obtained in Preparation Example 2 was used.

Example 10

A white resin composition was obtained in the same manner as in Example 3 except that the surface-treated calcium carbonate obtained in Preparation Example 3 was used.

Example 11

A white resin composition was obtained in the same manner as in Example 3 except that the surface-treated calcium carbonate obtained in Preparation Example 4 was used.

Example 12

A white resin composition was obtained in the same manner as in Example 3 except that the surface-treated calcium carbonate obtained in Preparation Example 5 was used.

Example 13

A white resin composition was obtained in the same manner as in Example 3 except that the surface-treated calcium carbonate obtained in Preparation Example 6 was used.

Comparative Example 6

A white resin composition was obtained in the same manner as in Example 3 except that the surface treated calcium carbonate obtained in Comparative Preparation Example 1 was used.

Comparative Example 7

A white resin composition was obtained in the same Manner as in Example 3 except that the surface-treated calcium carbonate obtained in Comparative Preparation Example 2 was use

Comparative Example 8

A white resin composition was obtained in the same manner as in Example 3 except that the surface-treated calcium carbonate obtained in Comparative Preparation Example 3 was used.

[Measurement of Degree of Whiteness Before and After Thermal Resistance Test]

Each of the molded bodies of white resin compositions obtained in the above Examples and Comparative Examples was measured in terms of degrees of whiteness before and after the thermal resistance test in the same manner as in Experiment 1. The measurement results are shown in Table 3. Table 3 also shows the results of Example 3.

TABLE 3

| | Calcium Carbonate | | Whiteness | |
|---|---|---|---|---|
| | Average Particle Diameter [μm] | Type | Before Thermal Resistance Test | After Thermal Resistance Test |
| Comparative Example 6 | 0.03 | Synthetic | 93.0 | 85.0 |
| Example 9 | 0.05 | Synthetic | 95.0 | 92.0 |
| Example 10 | 0.1 | Synthetic | 96.0 | 92.3 |
| Example 3 | 0.15 | Synthetic | 96.4 | 92.9 |
| Example 11 | 0.3 | Synthetic | 96.0 | 92.2 |
| Example 12 | 0.5 | Synthetic | 95.5 | 92.0 |
| Example 13 | 1 | Synthetic | 95.0 | 91.8 |
| Comparative Example 7 | 2 | Synthetic | 92.0 | 86.0 |
| Comparative Example 8 | 2 | Heavy | 89.0 | 83.0 |

As seen from Table 3, Example 3 and Examples 9 to 13, in which surface-treated calcium carbonate was prepared using synthetic calcium carbonate with an average particle diameter ranging from 0.05 to 1 μm according to the present invention, showed to have high degrees of whiteness before and after the thermal resistance test. On the other hand, Comparative Examples 6 to 8, in which the average particle diameter of calcium carbonate was out of the range defined in the present invention, did not have high degrees of whiteness before and after the thermal resistance test.

<Experiment 4>

Example 14

A white resin composition was obtained in the same manner as in Example 3 except that the surface-treated calcium carbonate obtained in Preparation Example 7 was used.

Example 15

A white resin composition was obtained in the same manner as in Example 3 except that the surface-treated calcium carbonate obtained in Preparation Example 8 was used.

Example 16

A white resin composition was obtained in the same manner as in Example 3 except that the surface-treated calcium carbonate obtained in Preparation Example 9 was used.

Example 17

A white resin composition was obtained in the same manner as in Example 3 except that surface-treated calcium carbonate obtained in the Preparation Example 10 was used.

[Measurement of Degree of Whiteness Before and After Thermal Resistance Test]

Each of the molded bodies of white resin compositions obtained in the above Examples and Comparative Examples was measured in terms of degrees of whiteness before and after the thermal resistance test in the same manner as in Experiment 1. The measurement results are shown in Table 4. Table 4 also shows the results of Example 3.

TABLE 4

|  | Amount of Silicone Oil for Treatment [parts by mass] | Content of Phosphorus [% by mass] | Whiteness | |
| --- | --- | --- | --- | --- |
|  |  |  | Before Thermal Resistance Test | After Thermal Resistance Test |
| Example 14 | 0.5 | 0.9 | 96.3 | 92.9 |
| Example 3 | 2 | 0.9 | 96.4 | 92.9 |
| Example 15 | 5 | 0.9 | 96.4 | 93.1 |
| Example 16 | 2 | 0.3 | 95.7 | 92.2 |
| Example 17 | 2 | 1.9 | 96.2 | 92.5 |

As seen from Table 4, Example 3 and Examples 14 to 17, in which the content of phosphorus in surface-treated calcium carbonate was within a range of 0.2 to 2% by mass and the amount of organic modified silicone oil for the treatment was within a range of 0.1 to 10 parts by mass relative to 100 parts by mass of calcium carbonate, showed to have high degrees of whiteness before and after the thermal resistance test.

<Experiment 5>

Example 18

A white resin composition was obtained in the same manner as in Example 3 except that the surface-treated calcium carbonate obtained in Preparation Example 11 was used.

Example 19

A white resin composition was obtained in the same manner as in Example 3 except that the surface-treated calcium carbonate obtained in Preparation Example 12 was used.

Comparative Example 9

A white resin composition was obtained in the same manner as in Example 3 except that the surface-treated calcium carbonate obtained in Comparative Preparation Example 4 was use Comparative Example 10

A white resin composition was obtained in the same manner as in Example 3 except that the surface-treated calcium carbonate obtained in Comparative Preparation Example 5 was used.

Comparative Example 11

A white resin composition was obtained in the same manner as in Example 3 except that the surface-treated calcium carbonate obtained in Comparative Preparation Example 6 was used.

[Measurement of Degree of Whiteness Before and After Thermal Resistance Test]

Each of the molded bodies of white resin compositions obtained in the above Examples and Comparative Examples was measured in terms of degrees of whiteness before and after the thermal resistance test in the same manner as in Experiment 1. The measurement results are shown in Table 5. Table 5 also shows the results of Example 3.

TABLE 5

| | Treatment with Condensed Phosphoric Acid or Silica | Treatment with Silicone Oil | Whiteness Before Thermal Resistance Test | Whiteness After Thermal Resistance Test |
|---|---|---|---|---|
| Example 3 | pyrophosphoric acid | dual-end epoxy-modified silicone oil | 96.4 | 92.9 |
| Example 18 | metaphosphoric acid | dual-end epoxy-modified silicone oil | 96.2 | 92.6 |
| Example 19 | pyrophosphoric acid | single-end epoxy-modified silicone oil | 96.2 | 92.4 |
| Comparative Example 9 | Silica | dual-end epoxy-modified silicone oil | 95.7 | 91.3 |
| Comparative Example 10 | pyrophosphoric acid | — | 95.6 | 91.5 |
| Comparative Example 11 | — | dual-end epoxy-modified silicone oil | 95.8 | 91.0 |

As shown in Table 5, it can be seen that Example 18, in which metaphosphoric acid was used as the condensed phosphoric acid, and Example 19, in which single-end epoxy-modified silicone oil was used as the organic modified silicone oil, also had high degrees of whiteness before and after the thermal resistance test. On the other hand, Comparative Example 9 in which calcium carbonate was treated with silica instead of condensed phosphoric acid, Comparative Example 10 in which calcium carbonate was treated only with condensed phosphoric acid, and Comparative Example 11 in which calcium carbonate was, treated only with organic modified silicone oil did not have high degrees of whiteness before and after the thermal resistance teat.

The invention claimed is:

1. A white resin composition containing: a white pigment; a surface-treated calcium carbonate in which particle surfaces of a synthetic calcium carbonate with an average particle diameter of 0.05 to 1 μm are subjected to surface treatment directly with a condensed phosphoric acid and then directly with an organic modified silicone oil; and a resin, wherein
a content ratio between the white pigment and the surface-treated calcium carbonate is, in mass ratio (white pigment to surface-treated calcium carbonate), within a range of 90:10 to 60:40, and
a total content of the white pigment and the surface-treated calcium carbonate in the resin composition is within a range of 5 to 70% by mass based on the total mass of the white resin composition, and
wherein the calcium carbonate is subjected to surface treatment with the condensed phosphoric acid so that a content of phosphorus in the surface-treated calcium carbonate falls within a range of 0.2 to 2% by mass based on the total mass of the surface-treated calcium carbonate.

2. The white resin composition according to claim 1, wherein an amount of the organic modified silicone oil for the treatment in the surface-treated calcium carbonate is within a range of 0.1 to 10 parts by mass relative to 100 parts by mass of calcium carbonate.

3. The white resin composition according to claim 1, wherein the organic modified silicone oil is epoxy-modified silicone oil.

4. The white resin composition according to claim 1, wherein the white pigment is titanium oxide.

5. A white resin composition containing: a white pigment; a surface-treated calcium carbonate in which particle surfaces of a synthetic calcium carbonate with an average particle diameter of 0.05 to 1 μm are subjected to surface treatment directly with a condensed phosphoric acid and then directly with an organic modified silicone oil; and a resin, wherein
a content ratio between the white pigment and the surface-treated calcium carbonate is, in mass ratio (white pigment to surface-treated calcium carbonate), within a range of 90:10 to 60:40, and
a total content of the white pigment and the surface-treated calcium carbonate in the resin composition is within a range of 5 to 70% by mass based on the total mass of the white resin composition, and
wherein an amount of the organic modified silicone oil for the treatment in the surface-treated calcium carbonate is within a range of 0.1 to 10 parts by mass relative to 100 parts by mass of calcium carbonate.

6. The white resin composition according to claim 5, wherein the organic modified silicone oil is epoxy-modified silicone oil.

7. The white resin composition according to claim 5, wherein the white pigment is titanium oxide.

* * * * *